Oct. 12, 1937.   H. G. KITTREDGE ET AL   2,095,879
LABEL
Filed Feb. 23, 1935
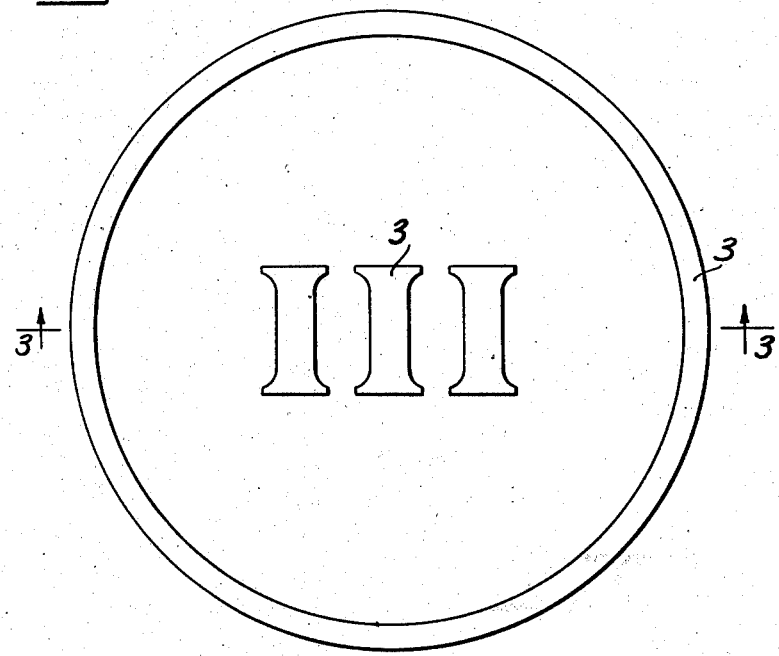
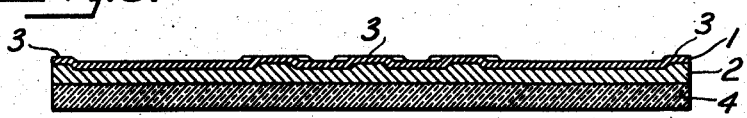
INVENTORS
HARVEY G. KITTREDGE,
FRANK W. WILLIAMS.
BY
Toulmin + Toulmin
ATTORNEYS Patented Oct. 12, 1937

2,095,879

UNITED STATES PATENT OFFICE 2,095,879

LABEL

Harvey G. Kittredge and Frank W. Williams, Dayton, Ohio, assignors to Foilfilm, Inc., Dayton, Ohio, a corporation of Ohio Application February 23, 1935, Serial No. 7,793

11 Claims. (Cl. 40—2)

Our invention relates to labels.

It is the object of our invention to provide a metal label which will adhere to glass upon the application of heat and in some cases the application of pressure.

In particular it is the object to provide a metal label made out of metal foil of the approximate thickness from .0001 to .025.

It is a special object to provide such a metal or foil label that is structurally weak but which when coated to form the composite structure of this invention is structurally strong and can withstand printing, embossing and the like.

It is a further object of the invention to eliminate in labels the use of paper, glue and the like. These materials are not only cumbersome but expensive to use and raise a number of difficulties in practice because of the difficulty of causing the paper to adhere to the metal and to adhere to the glass on which labels are customarily mounted.

It is a further object to provide a label that will adhere to impervious materials such as glass, as well as to leather, paper, fiber, textiles and the like.

Referring to the drawing, Figure 1 is a large section through a composite label of foil, synthetic resin and a glass support upon which the label has been mounted.

Figure 2 is a front elevation of the label.

Figure 3 is a section on the line 3—3 of Figure 2 showing such a label embossed and mounted upon a glass back.

Referring to the drawing in detail, I designates a layer of metal of any desired thickness. We prefer to use metal foil of the approximate dimensions of .0001 to .025.

A coating of synthetic resin that is metal-adherent, flexible, tough, strong and glass-adherent is applied to the back of the metal while in a fluid or plastic condition so that it adheres to the metal. It may then be immediately applied to the glass surface, but preferably the coating 2 of synthetic resin adheres to the metal as a structurally strong, metal-adherent film, forming a permanent, composite product with the metal foil. Then the composite material is embossed with designations such as at 3, and thereafter, upon being heated, the backing material becomes sufficiently plastic to adhere to the glass support 4. Glass is illustrated because it is the most difficult material on which a label has to adhere. It will be noted that this plastic backing flows into the depressions formed by the embossing 3. A continuous, smooth and adherent backing is thus provided.

The structurally strong supporting backing for the metal may be made of a variety of synthetic resinous materials provided they have the characteristics in the compound of metal-adherence, transparency, a hard, smooth, tough body at ordinary temperatures, and the capacity for becoming adhesive upon the application of slight heat and slight pressure.

A typical compound which we have found satisfactory is the following:

We have found that among the materials that provide for a tough body film are cellulose acetate, cellulose nitrate, vinyl acetate, vinyl acetate polymerized, vinyl acetate modified with acetaldehyde, and various other equivalent resins that are normally flexible and hard and tough, but not adherent to metal.

We have found that substances that are adherent to metal, but which are not flexible, hard and tough are such materials as a saturated alkyd resin, coumeron-indene resin, a phenolic resin shellac, dewaxed shellac, and gum dammar.

We have found that materials which are suitable plasticizers are chlorinated diphenyl, triphenyl phosphate, tricresyl phosphate and dibutyl phthalate. Such plasticizers are flexible and control the drying rate.

We find such solvents as toluol and naphtha to be suitable for purposes of this invention.

We find that the addition of linoleate of lead controls the drying rate, and the addition of waxes and stearates controls the tendency of the compound in films to stick to one another, particularly where it is necessary to roll the composite foil film, after having been produced in the interim, before it is utilized in commerce.

Our invention consists of the combination of a tough body means and adherent means, and a flexible means, such as a polymerizer, together with a suitable solvent. The result is a non-hygroscopic metal and glass adherent film that can be used for the production of strong metal foil products, labels, cigarette packages and other forms of containers.

2.4 grams of vinyl acetate, 6 grams of phenolic resin, 2.5 grams of chlorinated diphenyl and 18 cc. of toluol, when applied at 105 degrees C. for three minutes to metal foil, provide a strong, tough product having a water-white brilliancy and sparkle. The product is strongly adherent to metal and cannot be detached therefrom at room temperatures, and the metal can be attached to glass by the application of heat and slight pressure.

There are a variety of other combinations than indicated but we have found the foregoing to be a satisfactory one in practice.

By the elimination of paper backing, the thickness of metal labels now existing in the art is materially reduced. The paper has the further disadvantage of being hygroscopic and of absorbing moisture, which has a solvent action upon the glue or adhesive used to join the paper and metal to the glass support. Any liquid spilling out of glass containers over the label was absorbed by the paper.

In the present instance, the label is very thin and the synthetic resinous backing is not affected by moisture and acids and alkalis customarily found in containers on which such labels are placed. The backing is non-hygroscopic. If there are configurations on the supporting surface, the film constituting the backing is sufficiently tough, flexible and adhesive to conform to the configurations. When the metal product is being formed into a label, without the metal-adherent backing it would be impossible to emboss and print the foil because of its structurally weak condition. Such printing and embossing can be carried out by the present product, not only because it is strong, but because the embossing and printing cannot loosen the backing from the metal foil and the pressure employed will not cause the backing to become adhesive as in the case of the glue or adhesive ordinarily used on the composite strips from which metal labels are made.

It will be understood that we desire to comprehend within our invention such modifications as may be necessary to adapt it to varying conditions and uses.

Having thus fully described our invention, what we claim as new and desire to secure by Letters Patent, is:

1. A new article of manufacture for use as a label comprising a metallic sheet and single coat backing of a metal-adherent, synthetic resinous material capable under heat of adhering to other materials without becoming detached from the metal.

2. A new article of manufacture comprising a label consisting of metal foil and a synthetic resinous backing capable of adhering to glass and similar articles upon the application of heat.

3. A new article of manufacture for use as a label consisting of an embossed metallic film and a synthetic resinous composite body, said resinous body having the capacity of adhering to other articles without becoming detached from the metal either under pressure or the application of heat.

4. A new article of manufacture for use as a label comprising a printable, decorative metal film and a supporting synthetic resin single coat backing adherent to metal and also adherent under heat to glass.

5. A new article of manufacture comprising a structurally weak, metallic foil and a structurally strong, metal-adherent, flexible synthetic resin backing capable upon the application of heat of adhering to objects without becoming detached from the metal foil.

6. A new article of manufacture for use as a label comprising a metal foil of the approximate thickness ranging from .0001 to .025, and a metal-adherent, flexible, structurally strong synthetic resin backing capable of adhering to other articles.

7. A new article of manufacture for use as a label comprising a metal foil of the approximate thickness ranging from .0001 to .025, and a metal-adherent, flexible, structurally strong synthetic resin backing capable of adhering to other articles when heated without becoming detached from the metal foil.

8. A new article of manufacture for use as a label comprising a metallic foil and a single coat backing that is metal-adherent consisting of a tough body film means, a metal-adherent means, and a plasticizing means.

9. A new article of manufacture for use as a label comprising a metallic film and a single coat backing that is non-hygroscopic, strong, flexible, non-aging and metal-adherent consisting of a tough body film means, a metal-adherent means, and a plasticizing means.

10. A new article of manufacture for use as a label comprising a metal sheet and a single coat backing which is strong, flexible, non-hygroscopic and thermoplastic under heat comprising vinyl acetate, phenolic resin, and chlorinated diphenyl.

11. A new article of manufacture for use as a label comprising a metallic foil of the approximate dimensions of .0001 to .025, and a backing that is structurally strong and metal-adherent comprising vinyl acetate, phenolic resin, and chlorinated diphenyl.

HARVEY G. KITTREDGE.
FRANK W. WILLIAMS.